US009880786B1

(12) United States Patent
Brown

(10) Patent No.: US 9,880,786 B1
(45) Date of Patent: Jan. 30, 2018

(54) MULTI-TIERED ELASTIC BLOCK DEVICE PERFORMANCE

(71) Applicant: Amazon Technologies, Inc., Reno, NV (US)

(72) Inventor: Allen Herbert Brown, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 352 days.

(21) Appl. No.: 14/292,634

(22) Filed: May 30, 2014

(51) Int. Cl.
*G06F 3/06* (2006.01)

(52) U.S. Cl.
CPC .......... *G06F 3/0665* (2013.01); *G06F 3/0611* (2013.01); *G06F 3/0619* (2013.01); *G06F 3/0649* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 6,895,485 B1 * | 5/2005 | Dekoning | ............. | G06F 3/0605 711/114 |
| 8,429,346 B1 * | 4/2013 | Chen | ..................... | G06F 3/0613 709/213 |
| 8,843,459 B1 * | 9/2014 | Aston | ............... | G06F 17/30067 707/694 |
| 8,880,835 B2 * | 11/2014 | Benhase | ................. | G06F 3/061 707/651 |
| 8,918,621 B1 * | 12/2014 | Taylor | ................. | G06F 12/0223 707/822 |
| 8,930,746 B1 * | 1/2015 | Chen | .................... | G06F 11/0727 714/6.13 |
| 9,268,499 B1 * | 2/2016 | Wilkins | ................... | G06F 3/068 |
| 9,459,809 B1 * | 10/2016 | Chen | ..................... | G06F 3/0644 |
| 2003/0056058 A1 * | 3/2003 | Veitch | .................. | G06F 3/0601 711/112 |
| 2004/0243692 A1 * | 12/2004 | Arnold | .................. | G06F 9/5016 709/220 |
| 2004/0243699 A1 * | 12/2004 | Koclanes | ................ | H04L 29/06 709/224 |
| 2005/0273556 A1 * | 12/2005 | Gellai | .................. | G06F 3/0607 711/114 |
| 2009/0198748 A1 * | 8/2009 | Ash | ....................... | G06F 3/0611 |
| 2011/0078398 A1 * | 3/2011 | Jess | ......................... | G06F 3/061 711/162 |
| 2011/0106862 A1 * | 5/2011 | Mamidi | ............ | G06F 17/30221 707/823 |
| 2011/0276578 A1 * | 11/2011 | Allalouf | ................ | G06F 3/0604 707/755 |
| 2013/0151774 A1 * | 6/2013 | Bolik | .................... | G06F 3/0604 711/118 |

(Continued)

*Primary Examiner* — Kaushikkumar Patel
(74) *Attorney, Agent, or Firm* — Davis Wright Tremaine LLP

(57) ABSTRACT

Customers of a computing resource service provider may provision a logical volume using resources of the service provider. The customers may further specify a performance level for a portion of the logical volume that is greater than the minimum performance of the remainder of the logical volume. The service provider may then monitor the access patterns of the logical volume and dynamically increase performance of the most active area of the logical volume to the performance level specified by the customer.

20 Claims, 8 Drawing Sheets

(56) References Cited

U.S. PATENT DOCUMENTS

| | | | | |
|---|---|---|---|---|
| 2013/0232261 A1* | 9/2013 | Wright | ............... | H04L 41/50 |
| | | | | 709/224 |
| 2013/0318134 A1* | 11/2013 | Bolik | ............... | G06F 17/30194 |
| | | | | 707/827 |
| 2013/0326182 A1* | 12/2013 | Bavishi | ............... | G06F 3/0647 |
| | | | | 711/165 |
| 2014/0075111 A1* | 3/2014 | Pike | ............... | G06F 3/0665 |
| | | | | 711/114 |
| 2014/0130055 A1* | 5/2014 | Guha | ............... | G06F 3/0604 |
| | | | | 718/104 |
| 2014/0310488 A1* | 10/2014 | Strange | ............... | G06F 3/0667 |
| | | | | 711/162 |
| 2015/0006801 A1* | 1/2015 | Akutsu | ............... | G06F 3/0604 |
| | | | | 711/103 |
| 2015/0039826 A1* | 2/2015 | Burton | ............... | G06F 3/0611 |
| | | | | 711/114 |
| 2015/0186064 A1* | 7/2015 | Chen | ............... | G06F 3/065 |
| | | | | 711/162 |
| 2016/0041789 A1* | 2/2016 | Mills | ............... | G06F 3/0674 |
| | | | | 711/111 |

* cited by examiner

MULTI-TIERED ELASTIC BLOCK DEVICE PERFORMANCE

BACKGROUND

The use of remote computing services, such as remote program execution and remote data storage, has greatly increased in recent years. Customers may reduce expenses and overhead by purchasing these services from a computing resource service provider (also referred to as a service provider). Customer applications may be distributed over multiple virtual machine instances and computing systems. The virtual machine instances may be controlled by a hypervisor operating on a computing system. The hypervisor may expose one or more logical volumes to the virtual machine instances. The logical volumes may be implemented by one or more data storage servers using one or more block-level storage devices.

BRIEF DESCRIPTION OF THE DRAWINGS

Various embodiments in accordance with the present disclosure will be described with reference to the drawings, in which.

DETAILED DESCRIPTION

Figure 1:
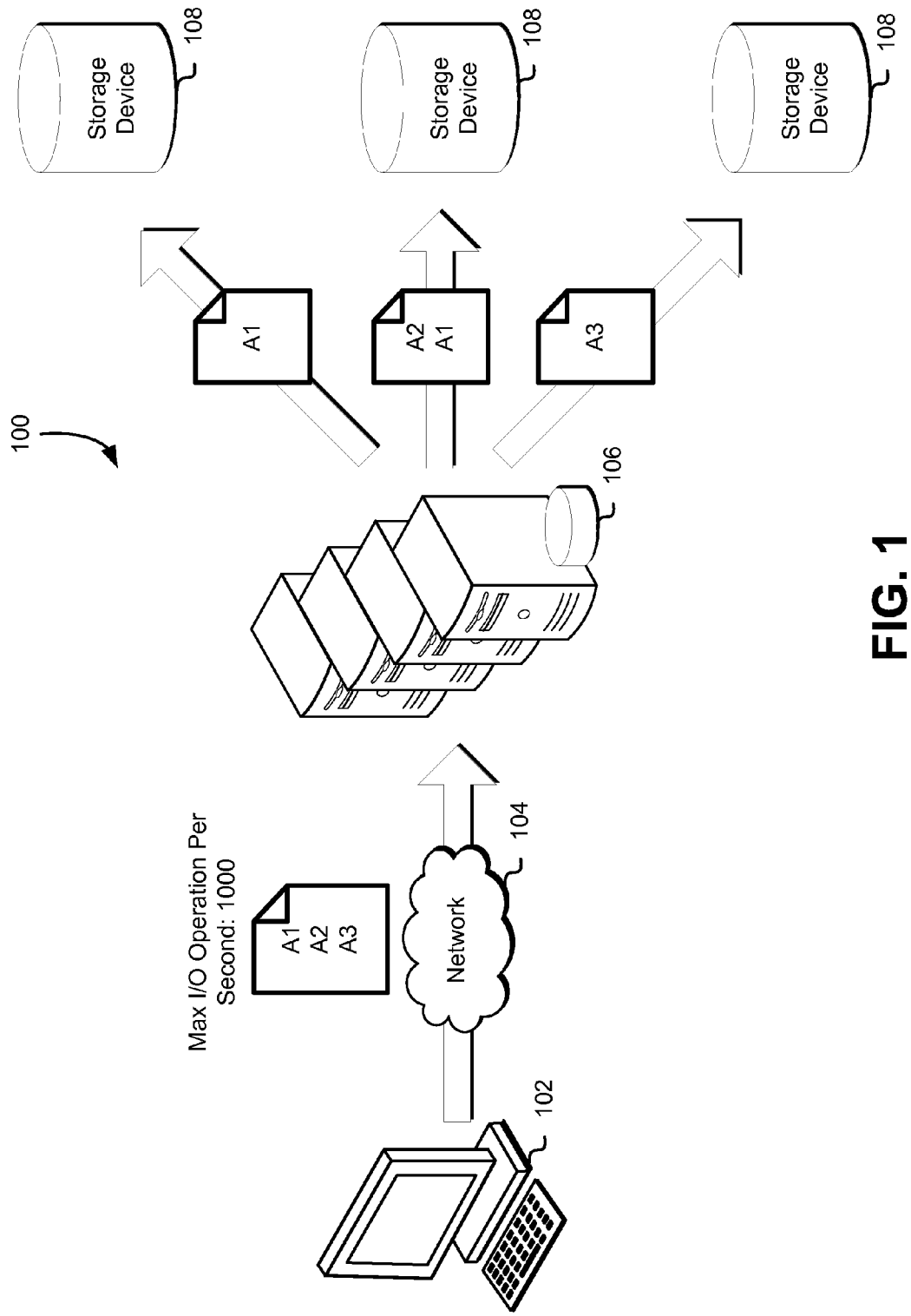
FIG. 1 illustrates an environment showing data striping across various storage devices in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include enhancements to a data storage service provided by a computing resource service provider (also referred to as a service provider), the data storage service may use one or more network attached storage devices, such as block-level storage devices, to provide data storage for customers of the service provider. The enhanced data storage service provides for the ability of the network attached block-level storage devices to incrementally re-stripe more active stripes on the volume and re-aggregate stored data as activity is reduced. For example, customers may be able to set maximum and minimum number of input and output operations per second (IOPS) for each stripe of data up to 100 gigabyte (GB) and as small as 1 GB. The size of the stripe of data designated by the customer may be less than the total size of the logical volume provisioned by the customer. For example, the customer may provision a logical volume of 100 GB for storing customer data, the customer may then indicate 50 GB of the logical volume to operate at a certain number of input output operations per second. The remaining 50 GB of the logical volume may operate at a certain number of input output operations per second lower than the number of input output operations indicated by the customer.

In an example, the customer may operate a website using computing resources of the service provider such as virtual machine instance executing a webserver and a logical volume attached to the virtual machine in order to store data corresponding to the website. The customer may then specify at least a portion of the logical volume to operate a maximum of 1,000 input output operations per second. For example, the customer may specify at least 5 GB of the customers 200 GB logical volume to operate at 1,000 input output operations per second. Furthermore, the customer may indicate a minimum number of input output operations per second for the remainder of the logical volume. The service provider or component thereof may also determine a portion of the customer's logical volume to provision at a higher number of input output operations per second. A performance service of the service provider may then monitor access request to the logical volume in order to determine the most active or "hot" areas of the logical volume. For example, the logical volume may be implemented by a data storage service using one or more block-level storage devices. The performance service may then monitor access to blocks of the storage devices to determine the areas of the logical volume accessed more frequently in order to stripe the determined areas of the logical volume in order to increase the number of input output operations per second. The service provider may recommend various configurations to the customer or the service provider may provision a portion of the customer's logical volume to a certain number of input output operations per second automatically (e.g. without a contemporaneous user request). For example, the service provider may recommend a portion of the customer's logical volume to stripe or the service provider may automatically stripe the customer's logical volume in order to achieve a certain performance level.

Data striping techniques may include segmenting logically sequential data, such as a file, so that consecutive segments are stored on different physical storage devices or different components of the same storage device such that each component may be accessed at the same time. Data striping may be used when the customer specifies a number of input output operations per second greater than what the service provider can provide under the current formulation of the customer's logical volume. The customer may also indicate a particular number of input output operations per second during the creation of the logical volume that require data striping in order to achieve the number of input output operations per second indicated by the customer. By spreading segments of data or files across multiple storage devices which may be accessed concurrently, the service provider may increase the total data throughput which may be provided to the customer. Striping may be used with a variety of different storage devices such as disk drives in redundant arrays of independent disks (RAID) storage, network interface controllers, computer systems in clustered file systems, grid-oriented storage or random-access memory (RAM).

The data storage service may dynamically adjust performance of a customer's logical volume by detecting access patterns (also referred to as an access profile) over a period and adjusting the throughput of the portion of the logical volume containing the data accessed most frequently. The access profile may indicate what areas of the logical volume that is accessed more frequently or less frequently than other areas of the logical volume. Logical volumes may be exposed to virtual machines or other computer systems such as a local device by the data storage service. For example, virtual machines controlled by a hypervisor executed by a host computer system of the service provider may attach logical volumes managed by the data storage service and exposed by the hypervisors to the virtual machines as local disk drives. The hypervisor or a component thereof, such as the performance service, may examine access patterns of the logical volume to determine which areas are accessed more frequently. For example, performance service may examine the request queue corresponding to the logical volume managed by the data storage service to determine which blocks are accessed over a period. The performance service may examine the queue over multiple periods and aggregate the data collected to determine which blocks are associated with the most requests.

The performance service may define heuristics to enable the data storage service to determine which area or areas of the logical volume may be striped in order to improve performance. For example, the hypervisor may determine based at least in part on a file system schema and the data collected corresponding to the block access requests which areas and associated files of the logical volume are accessed more frequently. The file system schema may define how data is stored and retrieved by the storage devices implementing the logical volume such as a file allocation table (FAT), universal disk format (UDF), new technology file system (NTFS) or other file system suitable for storing and retrieving data. The performance service may then cause the data storage service to stripe the areas of the logical volume associated with the blocks accessed most frequently. The data storage service may then spread the blocks across multiple devices enabling the data storage service to provide multiple simultaneous reads of the blocks in order to achieve greater input output operations per second. For example, the customer may specify a 1 GB block, of the customers 100 GB logical volume, with a minimum performance of 1000 input output operations per second and a minimum of 200 input output operations per second for the remainder of the logical volume. The data storage service may then instantiate the entirety of customer's 100 GB logical volume at 200 input output operations per second and allow access patterns over time to determine which 1 GB block of the customers 100 GB logical volume to stripe in order to achieve the minimum performance of 1000 input operations per second.

In some embodiments, the customer may be able to pre-stripe (also referred to as pre-warm) a portion of the logical volume such that the pre-warmed portion of the logical volume may operate at the maximum input output operations per second indicated by the customer. For example the customer may indicate a 10 GB block of the customer's logical volume to operate at 1000 input output operations per second and the customer may further indicate that the first 10 GB of the logical volume should be pre-warmed. Pre-warming a portion of the logical volume may include striping the data such that the maximum number of input output operations per second indicated by the customer may be achieved here contemporaneously with the logical volume being in an operational state. Furthermore, the customer may indicate a particular file or files of the logical volume to be pre-warmed. The customer may also indicate various performance levels, as opposed to a specific number of input output operations per second, the various performance levels may be slow access, fast access or really fast access.

Various techniques may be used in order to provide the customer with the requested number of input output operations per second. As described above the data may be striped across various storage devices in order to provide the data throughput requested by the customer. Data may also be sharded in order to provide increased throughput. Data sharding may include horizontally partitioning the logical volume across multiple storage devices. The storage devices may be located in the same location or different locations. For example, the customer's logical volume may be distributed between multiple storage devices in different data centers, the different data centers may be in different geographic locations. All or a portion of a logical volume may also be replicated across multiple storage devices in order to increase throughput. For example, a customer may indicate a 100 GB bucket of the customer's 300 GB logical volume, with a maximum of 4000 input output operations per second, the data storage service may stripe the indicated bucket across multiple storage devices and replicate at least a portion of the striped bucket across additional storage devices in order to achieve the maximum number of input output operations per second indicated by the customer.

FIG. 1 illustrates an example environment 100 where one or more computer systems running within a service provider environment, as well as the associated code running thereon, may provide customers with logical volumes wherein various portions of the logical volume may operate different performance levels. Customer 102 may transmit data over a network 104 to one or more data storage servers 106. The network 104 may be any suitable network such as the Internet, a local area network, wide area network or any other suitable communications network and/or other networks noted herein and/or combinations of networks. In various embodiments, the customer 102 may transmit commands over a network 104 to one or more virtual machines operated by the customer, the one or more virtual machines may then generate data on behalf of the customer and cause the data to be stored in the one or more data servers 106.

The one or more data servers 106 may include one or more storage devices 108. Furthermore, the one or more data servers 106 may be components of the data storage service operated by the service provider. The storage devices 108 may include any suitable storage device such as hard disk drives, solid-state drives, network storage devices, RAM, floppy disk drives, optical disk drives, tape drives or any other device suitable for storing data. The one or more data servers 106 may store data on behalf of the customer 102 and may also provide data to the customer 102 and/or one or more other customers. For example, the one or more data servers 106 may provide data for a website operated by the customer 102 using one or more other resources of the service provider. The data may be stored in a logical volume managed by the data storage service and stored across one or more storage devices 108. In order to increase the number of simultaneous or near simultaneous input or output operations that may be done on the logical volume, the logical volume may be spread out over multiple storage devices 108. The one or more storage devices 108 may be block-level storage devices. Furthermore, the customer may specify a portion of the customer's logical volume to be spread out over the one or more storage devices 108 in order to achieve a certain level of performance.

The customer 102 may provision a logical volume using resources of the one or more data servers 106. The customer may define various attributes of the logical volume including the size of the logical volume, the maximum number of input output operations per second and the minimum number of input output operations per second. The service provider may also define one or more attributes of the logical volume. Furthermore, the customer 102 may define a portion of the logical volume configured to perform at a level greater than the remainder of the logical volume. For example, the customer 102 through a client computing device may indicate a 1 GB portion of the logical volume to operate at a higher performance level. The indicated portion of the logical volume may also be referred to as a bucket. The one or more data servers 106 or components thereof may determine, based at least in part on the access patterns of the data contained in the logical volume, the blocks of data stored on the one or more storage devices 108 corresponding to the data contained in the logical volume to increase performance of.

For example, the customer 102 may operate a database using resources of the service provider such as the one or more data servers 106. Furthermore, the customer 102 may specify a portion of the database to operate in a higher performance level, for example, the customer may specify 5 GB of data should operate at the highest performance level. A performance service, described in greater detail below in connection with FIG. 3, may determine a 5 GB portion of the logical volume that may be accessed with the greatest frequency and may cause that portion of the logical volume to be spread out over the one or more storage devices 108 or placed on higher performing devices of the one or more storage devices 108. The data may be optimized using a variety of techniques including data striping, caching, redundancy, sharding, partitioning, mirroring and/or any combination of techniques.

Figure 2:
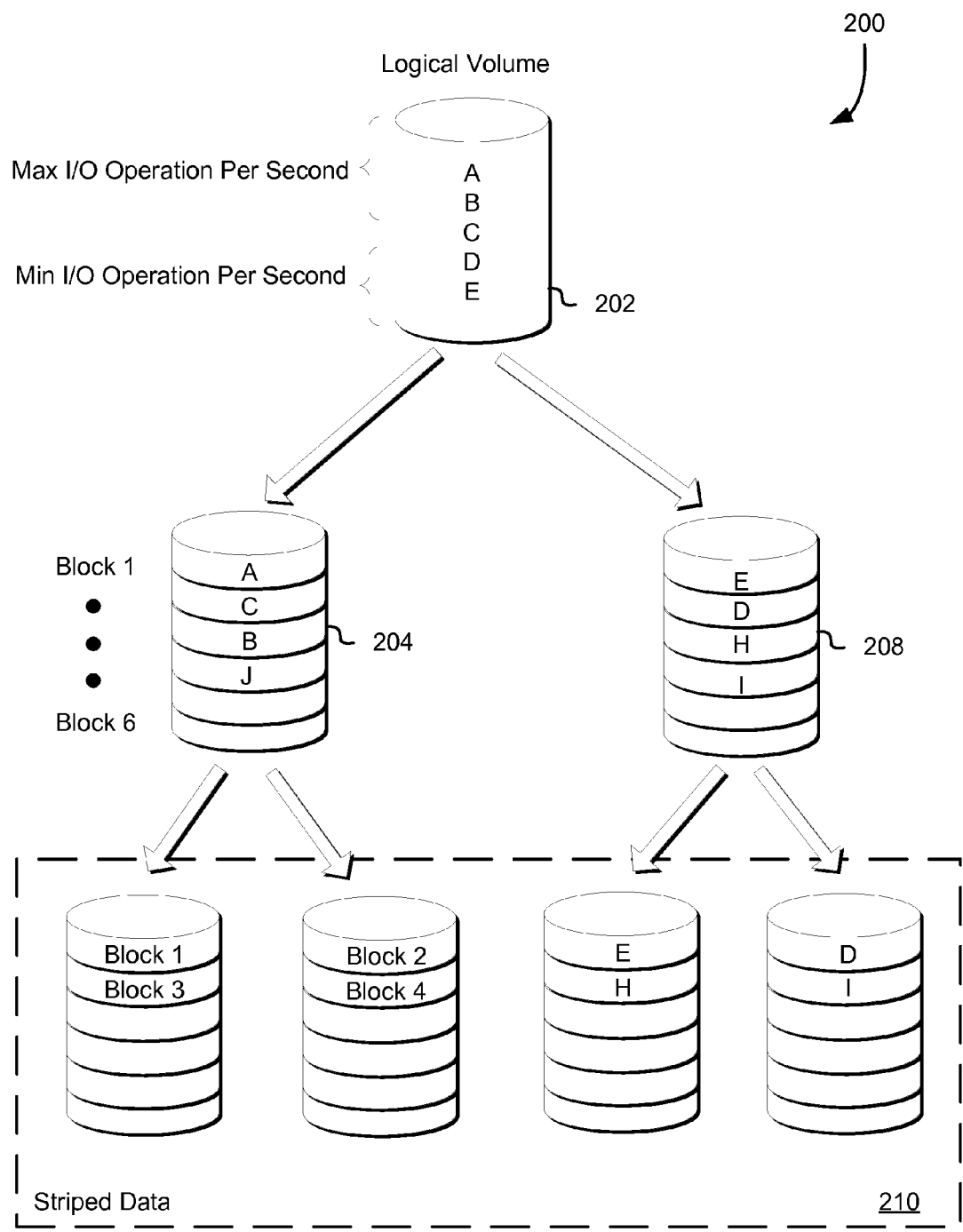
FIG. 2 illustrates an environment showing data striping across various storage devices in accordance with at least one embodiment.

FIG. 2 illustrates an example environment 200 where one or more computer systems, as well as the associated code running thereon, may provide customers with logical volumes 202 wherein various portions of the logical volume may operate different performance levels. All or a portion of the data contained in the logical volumes may be striped in order to achieve the different performance levels. Customer data may be stored across a variety of different devices such as storage devices 204 and 208. The customer data stored on the different devices may be exposed to a computer system operated by the customer as a logical volume 202. As described above, the customer may instantiate one or more virtual machines on computing resources of the service provider, the one or more virtual machines may attach the exposed logical volume to enable the customer to interact with the logical volume. The logical volume 202 may contain one or more files, illustrated in FIG. 1 as A, B, C, D and E. Furthermore, the storage devices 204 and 208 may be block-level storage devices configured to store data in blocks. For example, as illustrated in FIG. 2 file A may be stored in block 1 of storage device 204. Although, as illustrated in FIG. 2, each block contains one file, the block may contain more than one file or may contain only a portion of a file in accordance with the present disclosure. The storage devices 204 and 208 may include any of the storage devices described above in connection with the storage devices 108 of FIG. 1.

The customer may indicate a portion of the logical volume to operate at a defined number of input output operations per second. The customer may indicate the number of input output operations per second as part of a service-level agreement (SLA). A SLA may be part of a service contract or other agreement between the customer and the service provider where the provided services are formally defined. The SLA may include a variety of different technical definition such as mean time between failures (MTBF), mean time to repair or mean time to recovery (MTTR), various data rates, throughput, jitter or other measurable details of the service provided. Returning to FIG. 2, the SLA illustrated may define the maximum and minimum number of input output operations per second of the logical volume 202. The customer may define these values using an application programming interface (API) call configured to provide the service provider with appropriate information for setting the maximum and minimum number of input output operations per second of the logical volume 202.

In order to achieve the maximum input output operations per second defined by the customer that data contained logical volume 202 may be allocated to storage device 204 and/or 208 as striped data 210. As illustrated in FIG. 2, the data may be striped such that the data contained in the logical volume is written to the storage device sequentially. For example, the storage device 204 may be implemented as a RAID 0 storage device where data is split evenly across multiple disks. Spreading the data contained in the logical volume over multiple disks may enable multiple simultaneous interactions with the data contained in the logical volume. As illustrated in FIG. 2, the files contained in the logical volume 202 may be written as striped data 210 such that file A may be written to block 1, file C may be written to block 2 and file B may be written to block 3. In this example, storage device 204 contains two disks with data striped evenly between the two disks. Other striping techniques or similar techniques configured to increase performance may be used in accordance with the present disclosure. For example, the entire logical volume may be replicated over storage devices 204 and 208 in order to increase performance. In another example, the files contained in the logical volume 202 may be cached on a storage device in order to increase performance.

As described above, the data access patterns of the logical volume 202 may be used to determine which files to provide at the higher performance levels and which files may be provided at the lower performance levels. The performance service may monitor requests corresponding to blocks of the storage devices 204 and 208 and determine over a period which blocks are accessed more frequently. The performance service may then determine which files correspond to the determined blocks based at least in part on the file allocation tables associated with the storage devices 204 and 208. The performance service may monitor the request over multiple periods to determine which files are accessed more frequently than other files contained in the logical volume. Based at least in part on which files are accessed more frequently the data storage service may cause the files accessed more frequently to be provisioned as striped data 210.

For example, the customer may operate a database with data stored in logical volume 202. Furthermore, the customer may indicate a 1 GB portion of the logical volume 202 that may operate at 2000 input output operations per second as the maximum input output operations per second and the remainder of the volume may operate at the minimum number of input output operations per second. In various embodiments, the service provider may set a default minimum number of input output operations per second. Returning to the example above, the customer may cause data to be written to the database and may then read the newly written data from the database in order to perform various calculations on the data. The remainder of the data in the database may be considered "cold" data or otherwise infrequently used data. The performance service may monitor the access patterns of the database to determine the 1 GB portion of the logical volume 202 to provision as striped data 210 such that the maximum number of 2000 input output operations may be achieved. The performance service may continue to monitor the operation of the database such that the data contained in the logical volume may be re-striped or otherwise re-allocated to maintain frequently used data as striped data 210. In this manner, frequently used data may be maintained in the high performing 1 GB portion of the logical volume 202 indicated by the customer.

Figure 3:
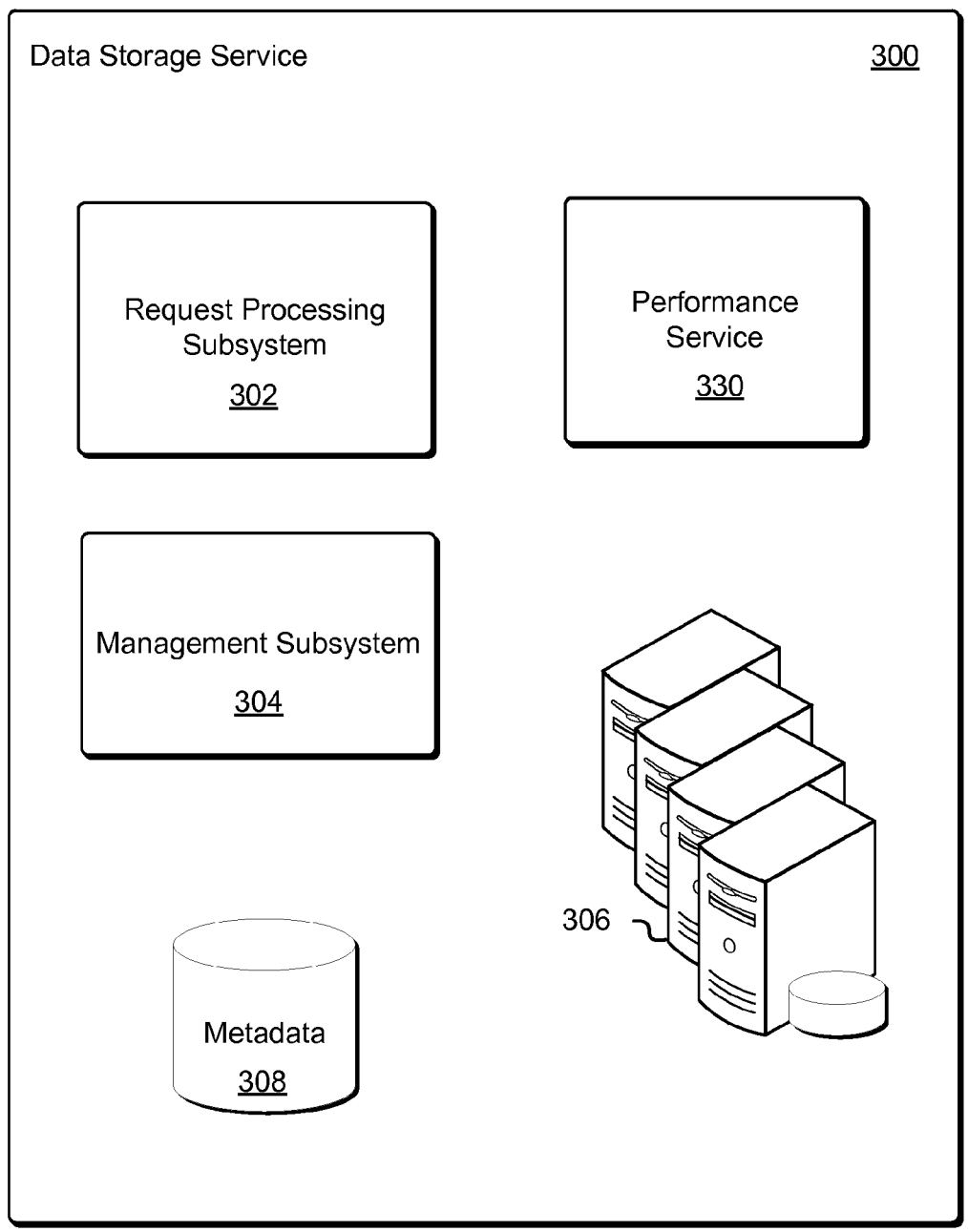
FIG. 3 illustrates a data storage service in accordance with at least one embodiment.

FIG. 3 shows an illustrative example of a data storage service in accordance with various embodiments. The data storage service 300 may be a service of a computing resource provider (also referred to simply as a service provider) used to operate a data storage service wherein a logical volume provided by the storage service may include more than one performance levels such as the logical volume described above in connection with FIG. 1. As illustrated in FIG. 3, the data storage service 300 includes various subsystems such as a request processing subsystem 302 and a management subsystem 304. In some embodiments, the data storage service may also include a performance service 330, the performance service 330 may determine areas of the logical volume that may be accessed more frequently by the other areas of the logical volume. The areas of the logical volume accessed more frequently may be striped or otherwise optimized in order to provide greater throughput.

The data storage service 300 may also include a plurality of data storage servers 306 and a metadata storage 308, which may store metadata about various data objects and/or logical volumes stored among the data storage servers 306 as described herein. In an embodiment, the request processing subsystem 302 is a collection of computing resources, such as webservers and application servers, collectively configured to process requests submitted to the data storage service 300. The request processing subsystem 302, for example, may include one or more webservers that provide a web service interface to enable customers of the data storage service 300 to submit requests to be processed by the data storage service 300. For example, the customer may define the number of input output operations per second of a particular logical volume using the one or more webservers. Furthermore, the request processing subsystem 302 may receive requests to interact with data stored by the one or more data storage service 306 as a logical volume. The request processing subsystem 302 may maintain a queue of requests to interact with data stored in the one or more data storage servers 306, described in greater detail below in connection with FIG. 5. The request processing subsystem 302 may include computer systems configured to make various determinations in connection with the processing of requests, such as whether policy allows fulfillment of a request, whether requests are authentic (e.g., electronically signed using a suitable cryptographic key) and otherwise.

Components of the request processing subsystem may interact with other components of the data storage service 300 (e.g., through network communications). For example, some requests submitted to the request processing subsystem 302 may involve the management of computing resources which may include data objects stored by the data storage servers 306. The request processing subsystem 302, for example, may receive and process requests to modify computing resources. For instance, in some examples, data objects are logically organized into logical volumes (also referred to as logical data containers). Data objects associated with a logical data container may, for example, be said to be in the logical data container. Requests to the data processing subsystem 302 may include requests for creating logical data containers, deleting logical data containers, providing an inventory of a logical data container, providing or updating access control policy with respect to one or more logical data containers and the like.

The requests may be processed by the management subsystem 304 upon receipt by the request processing subsystem 302. If applicable, various requests processed by the request processing subsystem 302 and/or management subsystem 304, may result in the management subsystem 304 updating metadata associated with data objects and logical data containers stored in the metadata store 308. Other requests that may be processed by the request processing subsystem 302 include requests to perform operations in connection with data objects. The requests, for example, may include requests to upload data objects to the data storage service 300, to download data objects from the data storage service 300, to delete data objects stored by the data storage service 300 and/or other operations that may be performed.

Requests processed by the request processing subsystem 302 that involve operations on data objects (upload, download, delete, e.g.) may include interaction between the request processing subsystem 302 and one or more data storage servers 306. The data storage servers 306 may be computer systems communicatively coupled with one or more storage devices for the persistent storage of data objects. For example, in order to process a request to upload a data object, the request processing subsystem may transmit data to a data storage server 306 for persistent storage. It is noted, however, that in some embodiments, client (e.g., customer) computer systems may transmit data directly to the data storage servers 306 instead of through severs in the request processing subsystem.

In some embodiments, the request processing subsystem 302 transmits data to multiple data storage servers 306 for the purpose of redundantly storing the data to allow the retrievability of data in the event of failure of an individual data storage server 306 and/or associated data storage device. For example, in some embodiments, the request processing subsystem uses a redundancy in coding scheme such as erasure coding to deconstruct a data object into multiple parts that are stored among the data storage servers 306. The parts may be configured such that if access to a certain number of parts is lost, the data object may nevertheless be reconstructable from the remaining parts that remain accessible.

Figure 4:
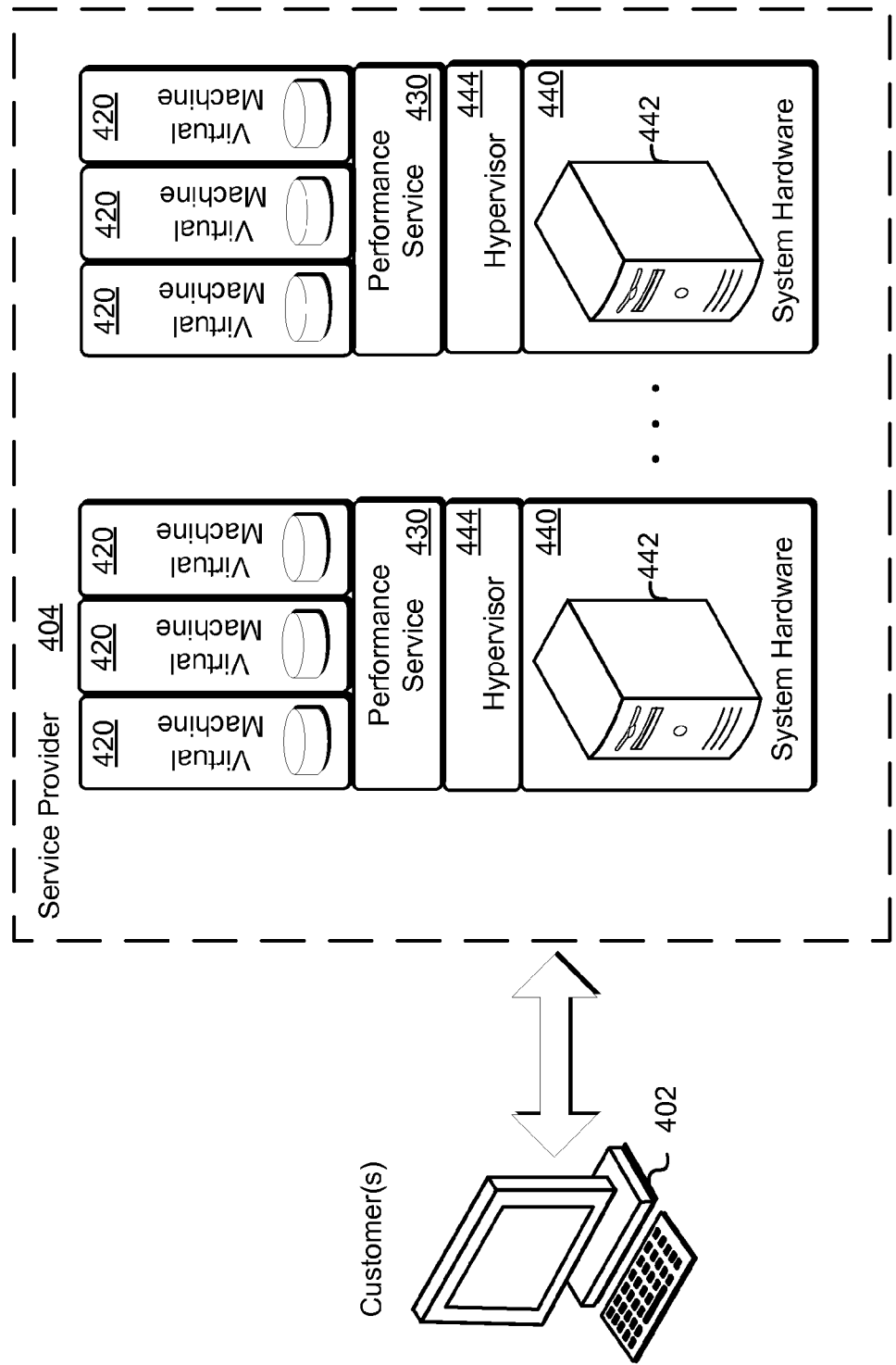
FIG. 4 illustrates an environment showing monitoring and re-striping data in accordance with at least one embodiment.

To enable efficient transfer of data between the request processing subsystem 302 and the data storage servers 306 and/or generally to enable quick processing of requests, the request processing subsystem 302 may include one or more databases that enable the location of data among the data storage servers 306. For example, the request processing subsystem 302 may operate a key value store that serves to associate identifiers of data objects with locations among the data storage servers 306 for accessing data of the data objects. In an embodiment, the performance service 330 is a collection of computing resources, such as a virtual machine executed by a host computer system configured to monitor one or more logical volumes and determine access patterns associated with the logical volumes. Although the performance service 330 is shown in FIG. 3 as a component of the data storage service 300, the performance service 330 may be implemented as a process of a hypervisor as illustrated in FIG. 4. The performance service 330 may retrieve information corresponding to logical volumes from the request processing subsystem 302 or other component of the data storage service 300. The performance service may then determine access patterns of the logical volumes based at least in part on the retrieved information.

FIG. 4 illustrates a virtual computer system service executing a plurality of virtual machines including logical volumes managed by a data storage service in accordance with at least one embodiment. The virtual computer system service, which may be system hardware 440, is used by a service provider 404 to provide computation resources for customers. The service provider 404 may include website operators, online retailers, social network providers, cable providers, online game providers or any entity capable of receiving automated agent traffic. The system hardware 440 may include physical hosts 442 also referred to as a host computer system. The physical hosts 442 may be any device or equipment configured to execute instructions for performing data computation, manipulation or storage tasks, such as a computer or a server. A physical host 442 may be equipped with any needed processing capability including one or more processors, such as a central processing unit (CPU), memory management unit (MMU), a graphics processing unit (GPU) or a digital signal processor (DSP), memory, including static and dynamic memory, buses and input and output ports that are compliant with any handshaking, communications or data transfer protocol. The system hardware 440 may also include storage devices, such as storage disks and tapes, networking equipment and the like. The storage devices may be executed by network storage devices managed by a data storage service.

A virtualization layer executing on the physical host 442 enables the system hardware 440 to be used to provide computational resources upon which one or more virtual machines 420 may operate. For example, the virtualization layer may enable a virtual machine 420 to access system hardware 440 on the physical host 442 through virtual device drivers on the virtual machine 420. Furthermore, physical host 442 may host multiple hypervisors of the same or different types on the same system hardware 440. The hypervisor 444 may be any device, software or firmware used for providing a virtual computing platform for the virtual machines 420. The virtual computing platform may include various virtual computer components, such as one or more virtual CPUs, virtual memory management units, virtual memory and the like. The virtual machines 420 may be provided to the customers of the service provider 404 and the customers may run an operating system or an application on the virtual machines 420. Further, the service provider 404 may use one or more of its own virtual machines 420 for executing its applications, such as the performance service 430. The hypervisor 44 may expose to the virtual machines 420 a logical volume implemented by the data storage service. Furthermore, performance service 430 may monitor requests received at the hypervisor 444 to interact with data contained in the logical volumes.

As described above, the virtual machine 220 may be used for various purposes, such as to operate as servers supporting a website, to operate business applications, or, generally, to serve as computing power for the customer. Other applications for the virtual machine 420 may be to support database applications, electronic commerce applications, business applications, and/or other applications. The performance service 430 may monitor the operation of the virtual machines 420 and determine one or more portions of the logical volumes attached to the virtual machines 420 that are interacted with more frequently than the other portions of the logical volume. The performance service 430 may then indicate to the data storage service to increase performance of the one or more portions of the logical volume. For example, the performance service may determine the most frequently accessed areas of the attached logical volumes based at least in part on access requests received at the hypervisor 444. The most frequently accessed areas of the attached logical volumes may include a file or portion thereof. The performance service 430 may determine the frequency of access for a particular portion of the logical volume based at least in part on a request queue associated with the logical volume. The data storage service may maintain a queue of requests to interact with data, described in greater detail below in connection with FIG. 5.

Figure 5:
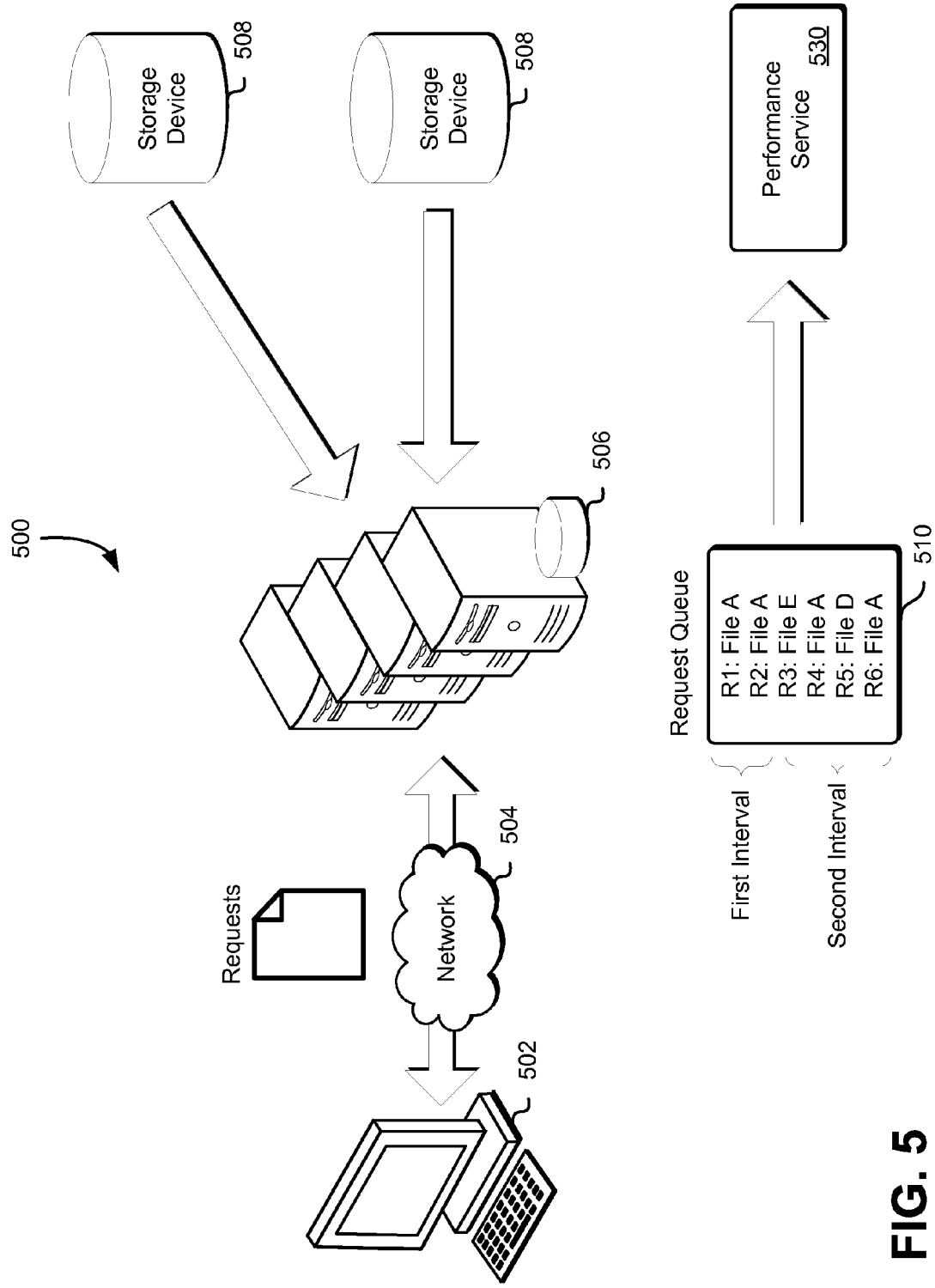
FIG. 5 illustrates an environment showing monitoring a request queue in accordance with at least one embodiment.

FIG. 5 illustrates an example environment 500 where one or more computer systems running within a service provider environment, as well as the associated code running thereon, may provide customers with data obtained from logical volumes based at least in part on a queue. Customers 502 may transmit data over a network 504 to one or more data storage servers 506. The network 504 may be any suitable network such as the Internet, a local area network, wide area network or any other suitable communications network and/or other networks noted herein and/or combinations of networks. The data storage service 506 may maintain a request queue 510 in order to process requests to interact with the data contained in one or more storage devices 508. The data contained in the one or more storage devices 508 may correspond to a logical volume associated with the customer 502. In various embodiments, the requests without the request queue 510, in this case, a log is generated based at least in part on the requests so that the performance service may determine the access patterns associated with the logical volume.

Returning to FIG. 5, if more requests are received than may be processed by the data storage servers 506 or storage devices 508 the requests may be placed into the request queue 510. Requests may be processed from the request queue 510 as computing capacity of the data storage service 506 or storage devices 508 becomes available. The performance service 530 may monitor the request queue 510 to determine access patterns associated with the logical volume. The access patterns associated with the logical volume may be the files, areas or blocks of the logical volume accessed more frequently than the other files, areas or blocks of the logical volume. For example, as illustrated in FIG. 5 the requests may be associated with files contained in the logical volumes. The data storage server 506 or other components of the data storage service, such as the request processing subsystem, may receive the request and determine one or more blocks of the storage devices 508 which contain the requested file.

The performance service 530 may obtain information from the request queue 510 corresponding to one or more intervals. For example, the performance service 530 may obtain information from the request queue corresponding to requests received during a particular 100 millisecond time period, referred to as a time bucket. The performance service 530 may obtain information corresponding to a plurality of different time buckets and aggregate the obtained information in order to determine the areas of the logical volume accessed more frequently. As illustrated in FIG. 5, the performance service may determine based at least in part on the request queue and the first and second interval that file A is accessed more frequently than other files associated with the logical volume. The performance service may then cause file A to be optimized by the data storage service in order to achieve higher performance as described above.

Similarly the performance service 530 may determine areas of the logical volume less frequently accessed and cause the data storage servers 506 to reduce the performance of the areas of the logical volume less frequently used. For example, the areas of the logical volume associated files E and D may be striped or otherwise configured for a greater number of input output operations per second than the remainder of the logical volume. The areas of the logical volume associated files E and D may have been striped due to a request by the customer 502 or based at least in part on access patterns previously associated with the logical volume. The performance service 530 may determine based at least in part on the first and the second interval that files E and D are less frequently accessed than file A and cause the data associated with files E and D to be re-allocated such that a lower number of input output operations per second is achieved.

Figure 6:
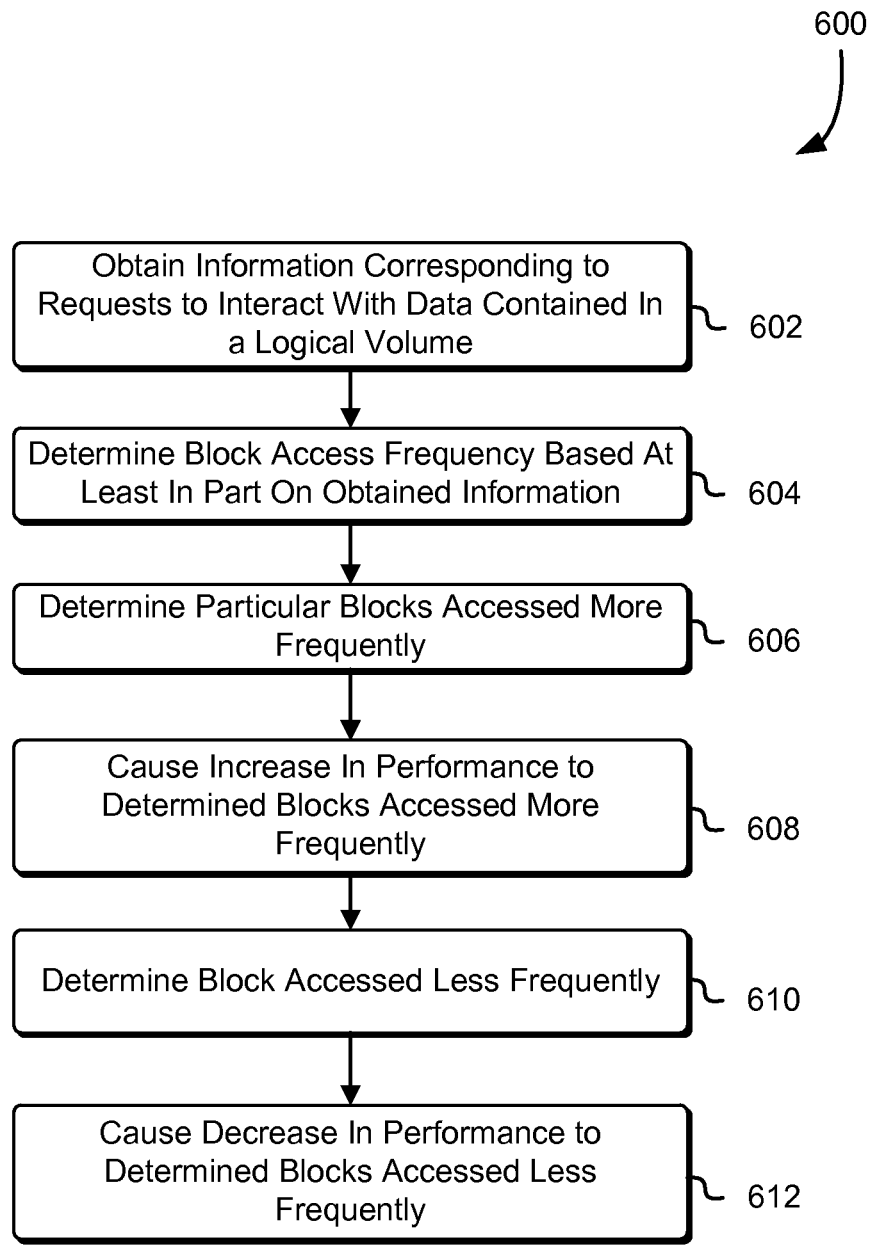
FIG. 6 illustrates a process for adjusting the performance of a storage device in accordance with at least one embodiment.

FIG. 6 shows an illustrative example of process 600 which may be used to increase or decrease performance of various parts of a logical volume. The process 600 may be performed by any suitable system such as the performance service 430 described above in connection to FIG. 4. Returning to FIG. 6, in an embodiment, the process 600 includes obtaining information corresponding to requests to interact with data contained in a logical volume 602. The information may be obtained from a request queue as described above in connection with FIG. 5. For example, the requests may be a request to retrieve a copy of a file contained in the logical volume. The information obtained may correspond to a period during which requests were received. For example, the information obtained may indicate which files contained in the logical volume were requested during a particular period of time. Furthermore, the information obtained may be aggregated with other information obtained from the request queue corresponding to other periods. The performance service may then determine block access frequency based at least in part on the obtainer information 604.

The performance service may determine particular blocks of the storage device corresponding to the obtained information. For example, the obtained information may indicate files contained in the logical volume requested and/or accessed by one or more customers of the service provider. The performance service may then determine particular blocks on storage devices implementing the logical volume corresponding to the obtained information. The performance service may then determine particular blocks accessed more frequently 606 than other blocks associated with the logical volume. For example, the customer may specify 5 GB of a particular logical volume to operate at 1200 input output operations per second. The performance service may then determine a particular number of blocks, equivalent to 5 GB, accessed more frequently than other blocks associated with the logical volume based at least in part on the obtained information.

The performance service may then cause an increase in performance to the determined blocks 608. The increase in performance to the determine blocks 608 may be an increase in the number of input output operations per second that may be performed on the data contained in the block. For example, the data contained in the blocks may be cached on fast storage devices or may be spread out over multiple storage devices in order to enable multiple operations simultaneously or near simultaneously. The data contained in the blocks may be striped, as described above, in order to increase performance of the determined block 608. The performance service may also determine striped data or otherwise optimized data that is accessed less frequently in order to re-allocate the computing resources allocated to the data. For example, the data may be log data generated by the customer that is no longer relevant or has otherwise become "cold" data.

The performance service may use the determined block access frequency 604 to determine one or more blocks of data accessed less frequently 610. In various embodiments, the performance service only checks blocks of data that have previously been striped or otherwise caused an increase in the number of input output operations per second capable on the data contained in the blocks. For example, the performance service may check the data contained in the higher performing portion of the logical volume to determine if the number of interactions with the data contained in the higher performing portion of the logical volume has decreased. The performance service may then cause decrease on performance to the blocks determined to be accessed less frequently to one or more other blocks associated with the logical volume 612.

Figure 7:
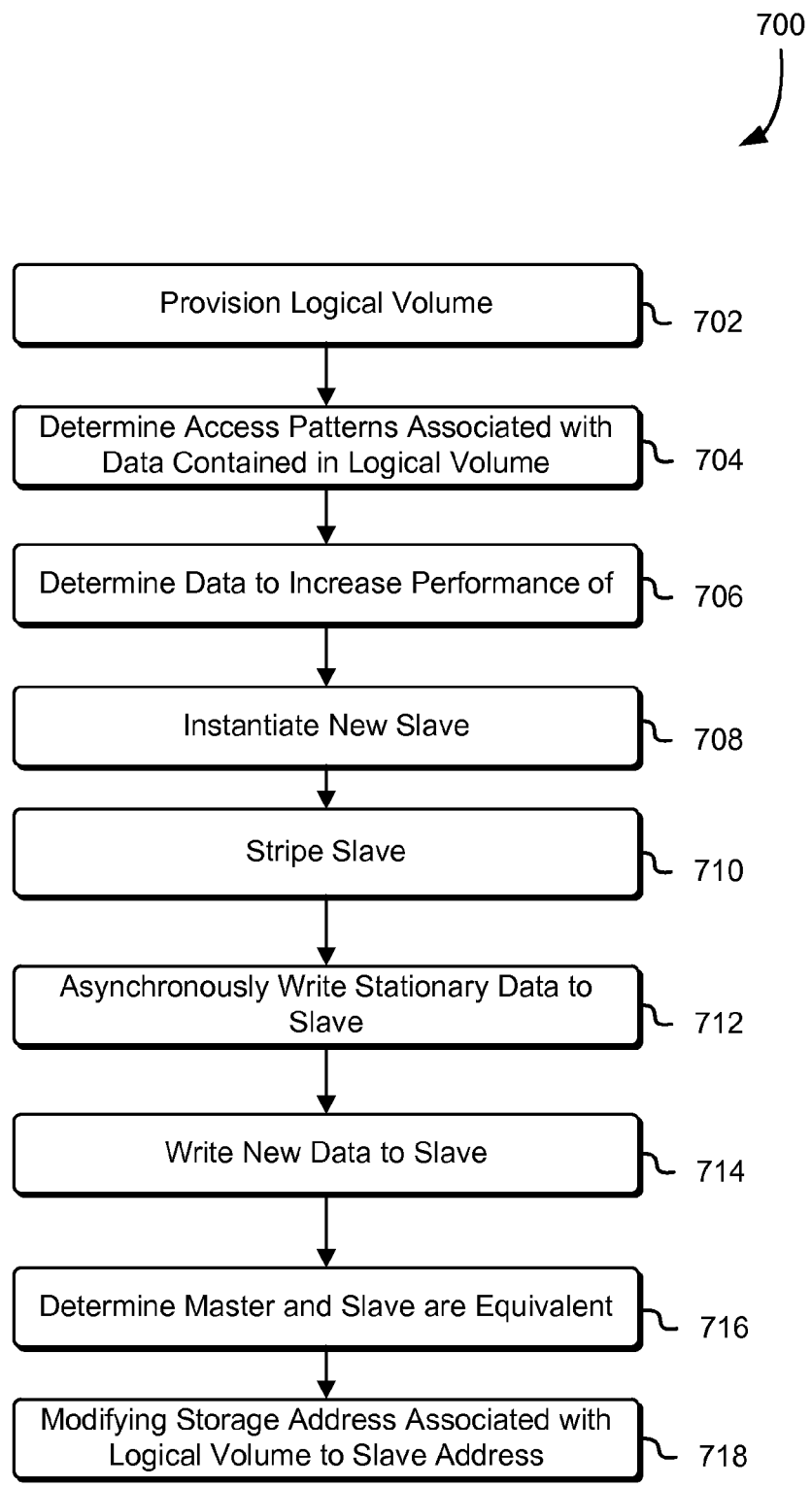
FIG. 7 illustrates a process for re-allocating customer data in accordance with at least one embodiment.

FIG. 7 shows an illustrative process 700 which may be used to increase performance of a logical volume. The process 700 may be performed by any suitable system such as the performance service 430 described above in connection to FIG. 4. Returning to FIG. 7, in an embodiment, the process 700 includes provisioning a logical volume 702. The logical volume may be a collection of computing resources, such as a storage device described above in connection with FIG. 1, exposed to one or more virtual machines operated by a customer. The performance service may determine access patterns associated with data contained in the logical volume 704. For example, the performance service may determine the areas of the logical volume access more frequently based at least in part on the request queue associated with the one or more storage devices implementing the logical volume. The performance service may then determine data contained in the instance to increase the performance of 706. The performance service may determine to increase the number of input output operations per second capable for a particular file contained in the logical volume based at least in part on the number of requests in the request queue associated with the particular file.

The performance service may then cause the increase in performance of the data to occur by transmitting a command or other information to the data storage service indicating the data to increase performance of. The data storage service or component thereof may then instantiate a new slave 708. The new slave may be a new storage device or a partition of a storage device such as the storage devices described above in connection with FIG. 1. The new slave may then be striped 710 such that the number of input output operations indicated by the customer may be achieved on the data contained in the logical volume accessed more frequently than other data contained in the logical volume. For example, the data storage service may determine one or more blocks associated with the data and one or more storage devices upon which that data may be written sequentially such that the data storage service may perform the indicated number of operations per second.

Once the data storage service has allocated the computing resources in such a manner that the more frequently accessed data may be stored so that the data storage service may perform the indicated number of operations per second, the data storage service may then begin to asynchronously write stationary data to the slave 712. For example, the data storage service may queue data to be written to the slave that has not been altered for a period. The write operations in the queue may then be performed once the data storage service has sufficient computing capacity to write the data to the slave. The data storage service may also write new data to the slave. For example, the virtual machine operated by the customer may write new data to the logical volume, the new data may be written to the storage device implementing the logical volume (also referred to as the master) and written to the slave. In various embodiments, the new data is written to the master and placed in queue to be written to the slave when the data storage service has sufficient computing capacity.

The data storage service may then determine that the master and the slave are equivalents 716 such that master and the slave contain the same data. For example, the data storage service may determine that the same write operations are being performed on the master and the slave simultaneously or near simultaneously. The data storage service may then enable the use of the slave by modifying the storage address associated with the logical volume to the address associated with the slave. For example, the data storage service may change the address associated with the logical volume in the request processing subsystem such that the request to interact with the logical volume are directed to the slave.

Figure 8:
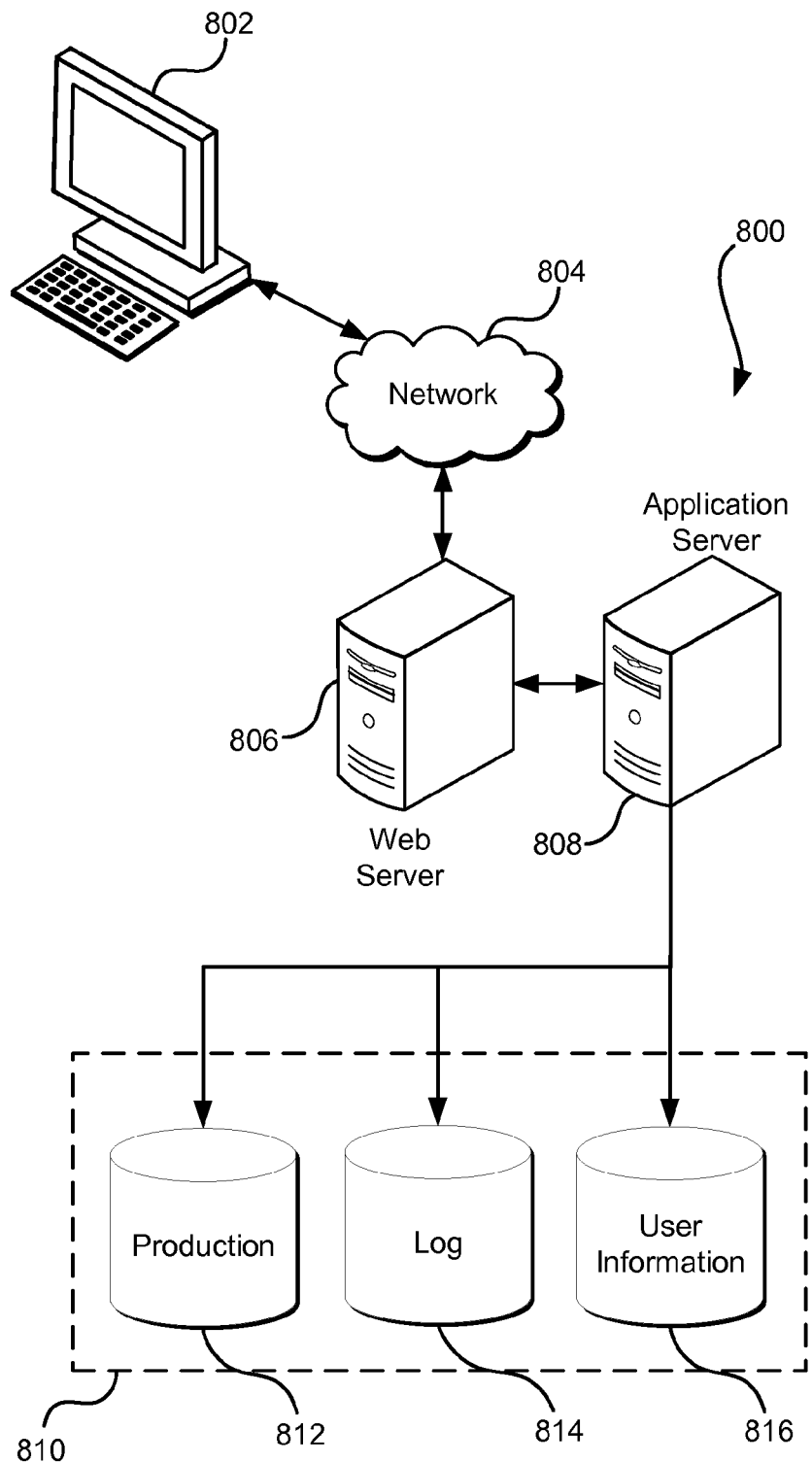
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    instantiating a logical volume to be accessible at a first number of input output operations per second;
    determining an access profile of a logical volume by at least analyzing access requests associated with the logical volume, allocated based at least in part on a request, over a time interval, the access profile indicating a first portion of the logical volume that is accessed more frequently than a second portion of the logical volume;
    determining one or more files associated with the first portion of the logical volume based at least in part on a file system schema;

striping data associated with the one or more files on a plurality of storage devices, based at least in part on the access profile, such that a second number of input output operations per second is achievable on the one or more files associated with the first portion of the logical volume, the second number being different from the first number; and enabling access to the striped data.

2. The computer-implemented method of claim 1, wherein the computer-implemented method further includes de-allocating computing resources to the second portion of the logical volume based at least in part on the access profile.

3. The computer-implemented method of claim 1, wherein enabling access to the striped data includes modifying an address associated with the logical volume such that the address is configured to direct traffic to the striped data.

4. The computer-implemented method of claim 1, wherein striping data include placing the data in an array of multiple disks wherein the data is split evenly across two or more disks of the array of multiple disks.

5. A system, comprising:
one or more processors; and
memory with executable instructions, that as a result of being executed by the one or more processors, cause the system to:
 instantiate a volume to be accessible at a first rate;
 determine an access profile of a volume over a time interval, the access profile indicating a portion of the volume interacted with more frequently than one or more other portions of the volume; and
 increase performance of the portion of the volume, based at least in part on the access profile, such that the indicated portion of the volume is accessible at a second rate for the portion of the volume, the second rate being different from the first rate.

6. The system of claim 5, wherein increasing performance of the portion of the volume includes re-allocating computing resources of one or more data storage servers from a second portion of the volume to the portion of the volume for which performance is to be increased.

7. The system of claim 5, wherein increasing performance of the portion of the volume includes striping data contained in the portion of the volume.

8. The system of claim 5, wherein increasing performance of the portion of the volume includes storing the portion of the volume in a plurality of computing resources of one or more data storage servers such that the portion of the volume is capable of multiple interactions over a period.

9. The system of claim 5, wherein determining the access profile of the volume over the time interval further includes receiving information from a request queue indicating interactions with one or more blocks of the volume.

10. The system of claim 9, wherein the memory further includes instructions, that as a result of being executed by the one or more processors, cause the system to determine one or more files associated with the one or more blocks based at least in part on a file system schema.

11. The system of claim 5, wherein the memory further includes instructions, that as a result of being executed by the one or more processors, cause the system to:
 receive information indicating a maximum number of input output operations per second and a minimum number of input output operations per second;
 increase performance of the portion of the volume to the maximum number of input output operations per second; and
 maintain a remainder of the volume at the minimum number of input output operations per second.

12. The system of claim 11, wherein the memory further includes instructions, that as a result of being executed by the one or more processors, cause the system to decrease the performance of the portion of the volume to the minimum number of input output operations per second based at least in part on the access profile.

13. A non-transitory computer-readable storage medium having stored thereon executable instructions that, as a result of being executed by one or more processors of a computer system, cause the computer system to at least:
 instantiate a volume to be accessible at a first rate;
 obtain interaction information corresponding to a set of blocks of a volume;
 determine a subset of the set of blocks interacted with more than a remainder of the volume based at least in part on the obtained interaction information; and
 increase a performance of the subset of the set of blocks, based at least in part on the obtained interaction information, to a second rate for the subset of the set of blocks by at least allocating additional computing resource of the computer system to the subset of the set of blocks, the second rate being different from the first rate.

14. The non-transitory computer-readable storage medium of claim 13, wherein the instructions further comprise instructions that, as a result of being executed by the one or more processors, cause the computer system to receive from a computer system operated by a customer a second performance level for a particular size portion of the volume.

15. The non-transitory computer-readable storage medium of claim 13, wherein the instructions further comprise instructions that, as a result of being executed by the one or more processors, cause the computer system to provision the volume using one or more block-level storage devices.

16. The non-transitory computer-readable storage medium of claim 13, wherein the instructions that cause the computer system to obtain interaction information corresponding to the set of blocks of the volume further include instructions that, as a result of being executed by the one or more processors, cause the computer system to:
 obtain information from a request queue associated with the volume, the request queue including requests to interact with one or more files contained in the volume, the information indicating one or more blocks associated with the one or more files; and
 allocating additional computing resource of the computer system to the one or more blocks based at least in part on the information.

17. The non-transitory computer-readable storage medium of claim 13, wherein the instructions that cause the computer system to increase the performance of the subset of the set of blocks further include instructions that, as a result of being executed by the one or more processors, cause the computer system to increase the performance such that a number of operations per second performable on the one or more blocks is increased.

18. The non-transitory computer-readable storage medium of claim 13, wherein the instructions further comprise instructions that, as a result of being executed by the one or more processors, cause the computer system to determine a change to the subset of the set of blocks interacted with more than a remainder of the volume and re-allocating computing resource of the computer system based at least in part on the change.

19. The non-transitory computer-readable storage medium of claim 13, wherein the instructions that cause the computer system to increase the performance of the subset of the set of blocks further include instructions that, as a result of being executed by the one or more processors, cause the computer system to stripe the set of blocks.

20. The non-transitory computer-readable storage medium of claim 13, wherein the instructions that cause the computer system to increase the performance of the subset of the set of blocks further include instructions that, as a result of being executed by the one or more processors, cause the computer system to maintain a location of the set of blocks in the volume while moving a physical location of the set of blocks to a storage device of the computer system capable of higher performance than a previous storage device associated with the set of blocks.

* * * * *